Feb. 1, 1966  M. B. HOLLANDER  3,232,638
PRESTRESSED TUBES AND RODS
Filed Nov. 26, 1962  3 Sheets-Sheet 1
FIG. 1
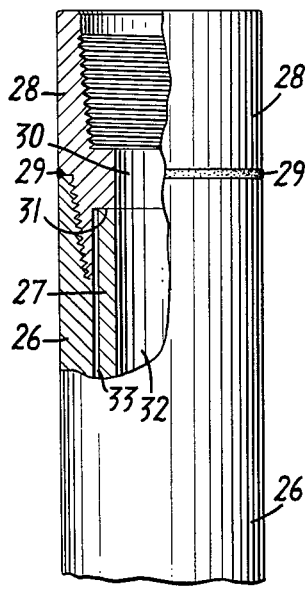
FIG. 3
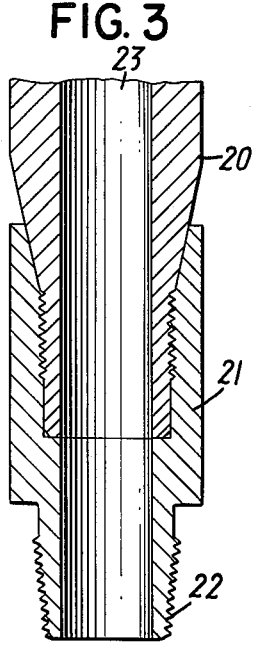
FIG. 4
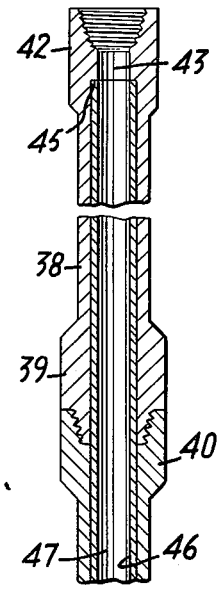
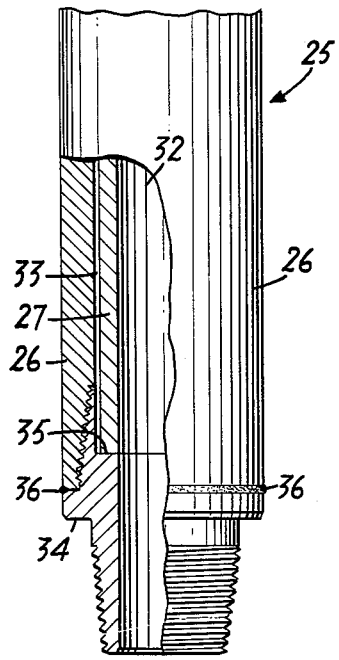
FIG. 2
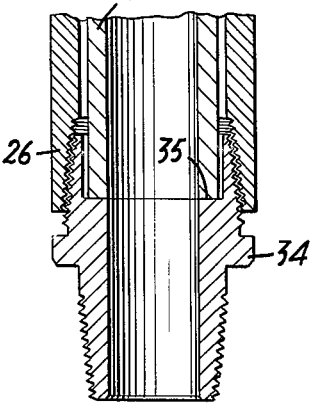
INVENTOR.
MILTON B. HOLLANDER
BY
*William A. Drury*
ATTORNEY

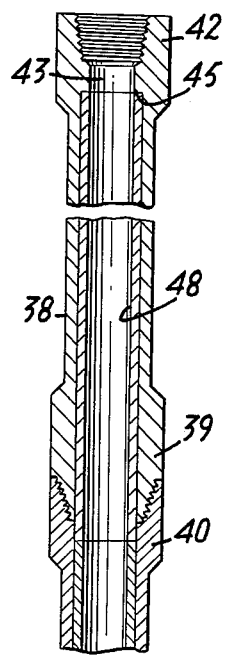
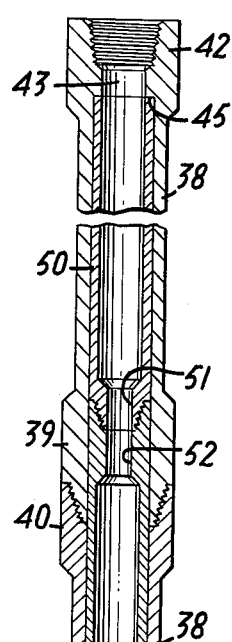
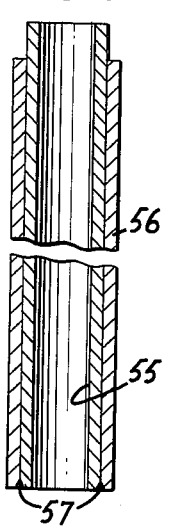
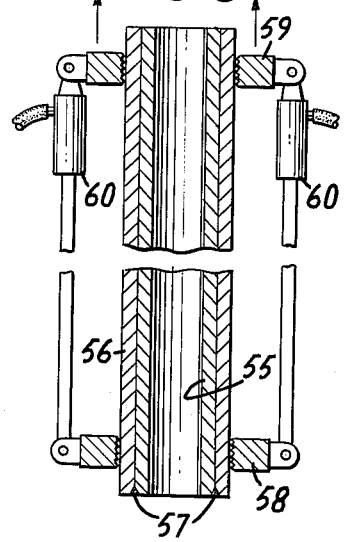
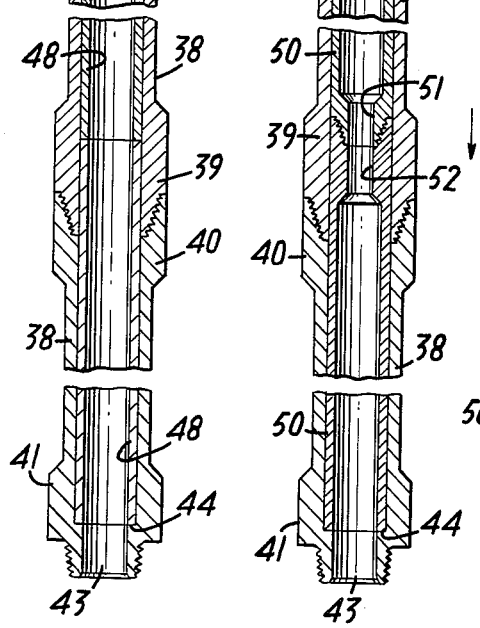
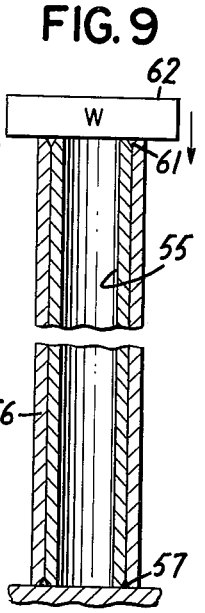
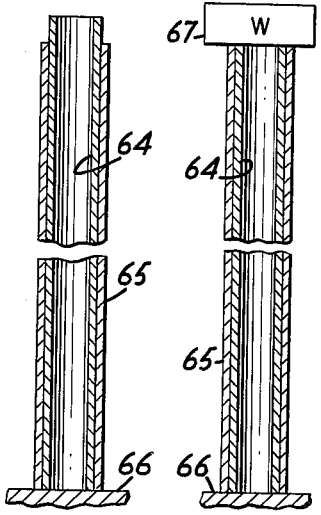

Feb. 1, 1966 M. B. HOLLANDER 3,232,638
PRESTRESSED TUBES AND RODS
Filed Nov. 26, 1962 3 Sheets-Sheet 3

INVENTOR.
MILTON B. HOLLANDER
BY
ATTORNEY

United States Patent Office 3,232,638
Patented Feb. 1, 1966

3,232,638
PRESTRESSED TUBES AND RODS
Milton Bernard Hollander, Stamford, Conn., assignor to American Machine & Foundry Company, a corporation of New Jersey
Filed Nov. 26, 1962, Ser. No. 239,999
1 Claim. (Cl. 285—55)

This invention relates in general to long columns, and, more particularly, to the long column which comprises at least the lower portion of a drill string for drilling oil wells and the like.

A long column may be defined as a column having a slenderness ratio over 100. The slenderness ratio of a column is the ratio of the length of the column to the radius of gyration of its cross section. When a long column is placed under compression, any non-uniform yielding in its cross section brings about further yielding with resulting lateral buckling and failure. The load which a long column will support before failure due to buckling may be computed by one of the derivations of the well-known Euler's formula. Euler's basic formula is as follows:

$$(1) \qquad P_{cr} = \frac{K\pi^2 EI}{L^2}$$

In the above formula, K is a coefficient which has a given form or value according to the manner in which the ends of a given column are fixed or supported.

E is the modulus of elasticity of the column, I is the section modulus of the column and L is the length of the column.

Thus it may be seen that buckling does not depend on the strength of the material of the column, but it depends on the dimensions of the column, its modulus of elasticity, and the end conditions. Therefore, the buckling resistance of a long column is commonly raised by increasing its section modulus by distributing as much material as far from the principal axis of the section as is possible in a given circumstance. For this reason, tubular sections are more buckling resistant than solid sections in long columns.

Drill collars at the lower end of a drill string are tubular sections subjected to compressive forces whose magnitude often exceeds the critical value above which the drill collars, considered as a long column, will buckle. Because drill collars are confined by the walls of the drilled hole, they do not necessarily fail or fracture as a result of being loaded above the critical value for buckling. However, the tendency to buckle caused by the loads required for oil well drilling often results in crooked holes being drilled. This situation is countered somewhat by using "stabilizers" to keep the drill collars located concentrically in the drill hole. In other circumstances, less force is exerted on the drill bit so as to reduce the buckling tendency. The lighter bit weight, however, slows down the drilling rate which is not desirable.

From Euler's formula, it becomes apparent that if the buckling load is countered by an opposite force, its tendency to buckle is reduced. Also, if an inner member is confined by an outer member, it is possible to exert compressive forces on the inner member above the critical force which causes buckling. In this invention, one tube is placed within another with the first tube placed under a relatively high axial compressive load, since it is constrained by the walls of the outer tube, it cannot buckle. The inner tube must be fixed at its ends to the outer tube thereby causing the outer tube to be in tension. Then, before the composite structure can buckle, it is necessary to apply loads considerably higher than the loads which would cause a conventional long tubular column of the same length and section modulus to buckle.

An object of this invention is to provide a long column structural member which will withstand a greater axial compressive load before buckling.

Another object of this invention is to provide drill collars or other portions of a drill string which will be able to withstand greater axial compressive loads without buckling.

A further object of this invention is to provide, in a long column, an outer tubular member and an inner member within the outer tubular member, the inner member being loaded in axial compression past the critical point at which said inner member buckles, said inner member being restrained from buckling by said outer member.

Still another object of this invention is to provide a drill string which will drill straighter holes.

Yet another object of this invention is to provide a less costly and more effective drill collar.

Many other objects, advantages and features of invention reside in the construction, arrangement and combination of parts involved in the embodiments of the invention and its practice as will be understood from the following description and accompanying drawing wherein:

FIGURE 1 is a side view of a drill collar section according to a first embodiment of this invention with a center portion broken away and with a lateral half of each end broken away in section to show its interior construction;

FIGURE 2 is a longitudinal section through one end of the drill collar of FIGURE 1 showing it during assembly;

FIGURE 3 is a longitudinal section through one end of a conventional drill collar;

FIGURES 4, 5 and 6 are longitudinal sections taken through conventional drill pipe modified to receive internal members according to second, third and fourth embodiments of this invention;

FIGURE 7 is a longitudinal section through two tubes disposed one inside the other and welded at one end;

FIGURE 8 is a longitudinal section through the two tubes of FIGURE 7 with an apparatus shown stressing the outer tube in tension;

FIGURE 9 shows the tubes of FIGURE 7 welded at both ends and supporting a weight;

FIGURE 10 is a longitudinal section through two tubes with one tube disposed inside inside the other forming a long column support structure according to this invention;

FIGURE 11 is a longitudinal vertical section through the two tubes of FIGURE 10 shown supporting a weight;

Figure 13:
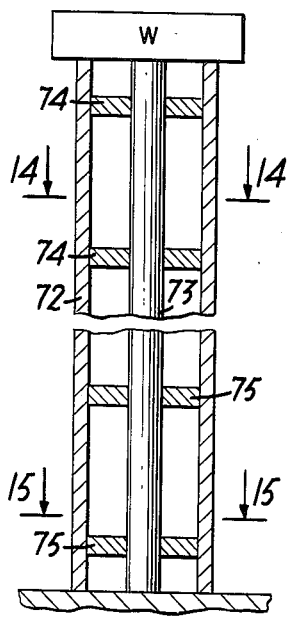
FIGURE 13 is a longitudinal vertical section through a long column structure having an outer tube and an inner rod of small diameter with spacer elements positioning the rod within the tube to prevent the rod from buckling.
Figure 14:
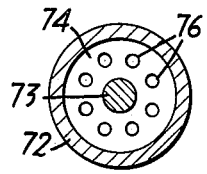
Figure 15:
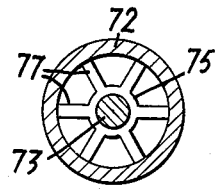
Figure 16:
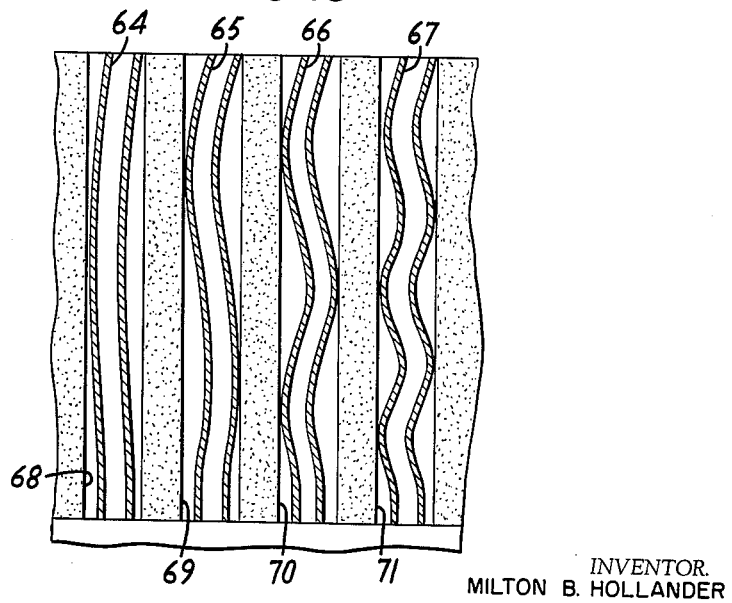

FIGURES 14 and 15 are horizontal, transverse sections taken on lines 14—14 and 15—15 of FIGURE 13; and FIGURE 16 shows buckling configurations of four drill strings loaded in compression in four drill holes.

Referring to the drawing in detail, FIGURE 3 shows a conventional drill collar 20. Drill collars 20 are usually made from large billets of steel which are precision bored to form the circulation channels 23 in each collar. The outer surfaces of the drill collars are then machined to precise tolerances. A replaceable end 21 is shown screwed onto one end of the drill collar 20.

This replaceable end 21 has the pin connection 22 formed integrally with it. Another replaceable end (not shown) is screwed to the other end of drill collar 20 and has a box connection formed in it.

Referring now to FIGURES 1 and 2, individual drill collars 25 may be fabricated according to a first embodiment of this invention using two lengths of tubing 26 and 27 of standard and available sizes. The outer tubing 26 has an end piece 28 screwed to it and held in place by welding a bead 29. End piece 28 contains the start of the circulating channel 30. An annular shoulder 31 machined in end piece 30 faces into the outer tube 26. Inner tube 27, containing the circulation channel 32, is slid into the outer tube 26. If stock tubing is used, the inside diameter of tube 26 will be from 1/16 inch to 1/2 inch larger than the outside diameter of tube 27 to leave a slight clearance 33 between the tubes. This slight clearance may be filled with oil, asphalt, or lead for example to absorb shock or vibration between the tubes.

As shown in FIGURE 2, an end piece 34, having a pin connection, is screwed onto the end of outer tube 26. End piece 34 has machined on it the annular shoulder 35 which engages the end of inner tube 27. As is further shown in FIGURE 2, shoulder 35 of end piece 34 engages the end of tube 27 before the end piece 34 is completely screwed down into tube 26. Therefore, as end piece 34 is tightened, it exerts a compressive force on tube 27 and puts tube 26 in tension. After end piece 34 is screwed into tube 26, it is locked in place by means of the welded bead 36.

If the cross sectional area of the drill collar shown in FIGURE 1 is substantially the same as that of the conventional drill collar shown in FIGURE 3, the stiffness or resistance to lateral bending of the drill collars 20 and 25 will be substantially the same if they are equally long. However, referring to Euler's formula as given above, the drill collar 25 of this invention will be able to withstand much greater compressive loads without buckling. An example will be given later in which Euler's formula will be applied to a conventional drill collar and to the drill collars of this invention.

The second embodiment of this invention uses standard drill pipe 38 as drill collars. FIGURE 4 shows central sections of drill pipe 38 having conventional external upset pin and box tool joints 39 and 40 welded or otherwise fixed to them. The lowermost section of drill pipe 38 which extends downward in the drill hole has a conventional box tool joint 40 welded on one end and a modified pin connection 41 welded on the other. The section of drill pipe 38 which extends uppermost in the drill hole has a conventional pin joint 39 welded on its lower end and a modified box connection 42 welded on its upper end. The modified pin and box tool joints 41 and 42 contain smaller diameter circulation channels 43 through their outwardly disposed portions and they have within them the inwardly disposed annular shoulders 44 and 45. A single long length of a stiffening tube 46 is lowered into the assembled drill pipes before the uppermost section is screwed in place. This stiffening tube 46 seats against the shoulder 44 of the tool joint 41. The stiffening tube 46, containing the circulation channel 47, is made longer than it is shown in FIGURE 4 so that, when the uppermost piece of drill pipe 38 is screwed into place, it will compress tube 46 between the shoulders 44 and 45. This places all the sections of drill pipe 38 in tension.

As shown in FIGURE 5, the third embodiment of this invention has the drill pipes 38 assembled as in the second embodiment of this invention. As the drill pipes 38 are made up and lowered into the drill hole, separate sections of stiffening tube 48 are lowered into the individual sections of drill pipe. The sections of tubing 48 butt together. As shown in FIGURE 5, the upper and lower sections of tubing 48 are made longer than the drill pipes that contain them so that the tubes may be withdrawn from the drill pipe when the drill string is withdrawn from the drill hole. The central sections of tubing may extend through more than a single drill pipe 38. For example, a single length of tubing 48 could extend through two drill pipes 38 or a single length of tubing 48 could extend through one and one-half drill pipes 38 so that two tubes 48 extend substantially through three sections of drill pipe 38. The total length of the stiffening tubes 48 must be slightly greater than that shown in FIGURE 5 so that the making up of the sections of drill pipe 38 will compress the tubes 48 between the shoulders 44 and 45.

The fourth embodiment of this invention is shown in FIGURE 6. The drill pipes 38 are assembled as has been described for the second and third embodiments of this invention. Into the assembled drill pipes 38 there is made up and lowered the stiffening sections 50 which are joined by the internally upset pin and box connections 51 and 52. These connections may be welded or otherwise secured to the stiffening tubes 50. The tube sections 50 are easily handled as they can be transported in short lengths and made up as required within the sections of drill pipe 38. As in the other embodiments of this invention, the internal tubes 50 are placed in compression and the drill pipes 38 in tension. This is accomplished by making the combined length of the internal tubes 50 longer than shown so that the screwing of the last section of drill pipe in place will compress the tubes 50 and cause forces to be exerted at the ends of the composite structure.

As an example, an evaluation will now be made of a hypothetical string of drill collars made according to one of the first four embodiments of this invention. Several assumptions will be made for the sake of simplicity. One assumption is that the drill collars are only loaded statically and another is that buckling conditions are similar to those of a slender column with one end fixed and one end free. Whether this latter assumption approximates the actual condition of a drill collar in a drill hole does not affect the validity of the following example because the various derivations of Euler's formula for different end conditions of a long column only vary by given constants. Thus whether the actual values computed in the following example hold true or not, the relative buckling resistance of conventional drill collars compared to the buckling resistance of the drill collars of this invention can be validly computed.

The derivation of Euler's formula which applies to a long column with one end fixed and one end free is as follows:

(2) $$P_{cr} = (2n+1)^2 \frac{EI\pi^2}{L^2}$$

Referring now to FIGURE 16, in the above formula $n$ will equal 0 for the buckling configuration of drill pipe 64 in drill hole 68, and $n$ will equal 1, 2 and 3, respectively, for the buckling configurations of drill pipes 65, 66 and 67 in drill holes 69, 70 and 71. Thus the critical load $P_{cr}$ may be computed which will give rise to a given buckling configuration.

*Example*

If a given conventional string of eight sections of drill collars are used, they will be about 240 feet long with a 6 inch outside diameter and a 2 13/16 inch inside diameter. To calculate the critical force required to reach the second critical load to produce the buckling configuration shown for tube 65 in drill hole 69 of FIGURE 16, Equation 2 above will be used.

(2) $$P_{cr} = (2n+1)^2 \frac{EI\pi^2}{L^2} = \frac{(9)(30 \times 10^6)(60)\pi^2}{(240 \times 12)^2} = 19{,}200 \text{ lbs.}$$

where $$I = \frac{\pi}{64}\left(6^4 - \frac{2^{134}}{16}\right) = 60 \text{ in.}^4$$

Thus the static critical buckling load for conventional drill collars for the condition $n=1$ for the drill collar 69, shown in FIGURE 16, is calculated to be 19,200 lbs. The first buckling load, in which $n=0$ and the drill collars assume the configuration of drill pipe 64 in FIGURE 16, may be computed to be about 2,100 lbs. In some cases, this lower load which causes the first buckling configuration may cause trouble in drilling.

If drill collars formed according to one of the first four embodiments of this invention are used in place of conventional drill collars, a predetermined preload of 60,000 lbs. can easily be applied at the ends of the structure. This preload must first be relieved before the collars can be buckled. For the purpose of this example, an outer tube having a 6 inch outside diameter and a 4⅛ inch inside diameter has placed within it a 4 inch outside diameter tube having a 2¹³⁄₁₆ inch inside diameter and extending the full length of the eight sections of drill collars as shown in FIGURES 4, 5 and 6. This composite structure has the same external and internal dimensions and approximately the weight and cross sectional area as the above conventional string of eight drill collars. For these dimensions, the cross sectional area of the outer tube is 15 sq. in. and the cross sectional area of the inner tube is 6.3 sq. in. If a compressive load of 60,000 lbs. is applied to the inner tube, it will be subjected to a compressive stress of about 10,000 p.s.i. The outer tube will be in about 4,000 p.s.i. tension. Since the inner tube is confined by the outer tube, it can be buckled without damage for any buckling condition; thus for the inner tube $n$ can equal 0, 1, 2, 3 up to almost any value provided the inner tube is not overloaded to fail in compression.

The imposed tensile force of 4,000 p.s.i. in the outer tube is of little significance in drilling. In fact, it is possible to increase the buckling resistance by increasing the pressure compressing the inner tube up to 30,000 p.s.i. without concern. Since drill collars are used at the bit end of a drill string and are in compression, there is no harm in having a tensile stress to the outer tube.

Thus in this example, the drill collar string of this invention must be loaded above 60,000 lbs. before it will buckle. The conventional drill collar string buckles first at 2,100 lbs, and then, critically, for drilling straight holes, at 19,200 lbs. Thus the foregoing example indicates at least a 3 to 1 superiority in buckling resistance for the drill collar strings of this invention over conventional drill collar strings.

Referring now to FIGURES 7, 8 and 9, a long column, which may be used in a drill string or as a structural member, may be assembled in the following manner. An inner tube 55 is placed within an outer tube 56. The inner tube 55 is slightly longer than the outer tube 56. Two ends of the tubes 55 and 56 are aligned and welded at 57 as shown in FIGURE 7. Two suitable jaws or other gripping devices 58 and 59 are placed about and grip the ends of the outer tube 56. By means of any suitable apparatus, such as the hydraulic cylinders 60, the jaws 58 and 59 are urged apart to stretch tube 56 until it is the same length as tube 55. When tube 56 is stretched as shown in FIGURE 8, it may be welded at 61 as shown in FIGURE 9 to provide a long column structure. As shown in FIGURE 9, when the jaws 58 and 59 are removed, the support structure comprising tubes 55 and 56 may support a weight 62 with greater resistance to buckling under compression as the outer tube 56 must be compressed to relieve the supporting action caused at the ends by inner tube 55 before the composite structure can buckle.

Referring now to FIGURES 10 and 11, if the practice of this invention requires vertical, long column structural elements to resist buckling, inner and outer tubes 64 and 65 may be erected on a suitable flat base 66. The inner tube 64 is made sufficiently longer than the outer column 65 so that the inner column 64 will be subjected to a desired compression when the weight 67 is supported by the composite long column structure. The outer tube 65 prevents the inner column 64 from buckling.

Figure 12:
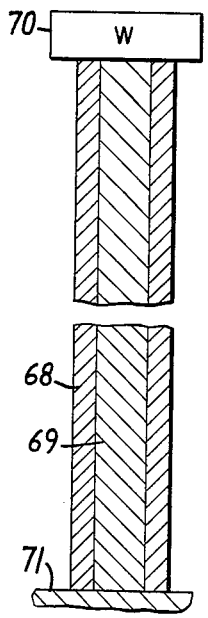
FIGURE 12 is a longitudinal section through a long column support structure having a rod disposed within a tube with the rod being restrained from buckling by the tube.

Referring now to FIGURE 12, a long column structure according to this invention may be made which is more resistant to buckling and which does not require two tubes disposed one inside the other with small clearance. FIGURE 12 shows a tube 68 having rod or shaft 69 disposed within it with a slight clearance. The composite structure may be placed upon a suitable base 71 to support the weight or load 70. The rod 69 is made longer than the tube 68 so that it is loaded in compression and restrained from buckling by the outer tube 68.

As shown in FIGURE 13, an outer tube 72 may be pretensioned or compressed to a lesser degree than the rod 73 which is disposed within it. While the rod 73 is not directly prevented from lateral buckling by the inner walls of tube 72, suitable support elements 74 and 75 are spaced along rod 73 at sufficiently close intervals to prevent it from buckling under a given load condition. If it is desired to prestress the long column structure shown in FIGURE 13 prior to its erection, the support elements 74 and 75 may be welded or otherwise fixed to the rod 73 and the tube 72 at the ends of the rod and the tube. Except for the ends of the structure, the elements 74 and 75 are free to slide in the outer tube 72 so that compression of the inner rod causes a force to be exerted at the ends of the outer tube.

If it is desired to have fluid flow within the tube 72, the spacer elements 74 may contain fluid flow apertures 76 shown in FIGURE 14. In a like manner, as shown in FIGURE 15, spacer element 75 may have radial arms 77 which contact the inner walls of the tube 72. Fluid may thus flow past the arms 77 within tube 72.

What is claimed is:

A hollow drill collar comprising, in combination, a pin connection having an outward facing annular shoulder, a box connection having an inward facing annular shoulder, an outer tubular member having high tensile strength to which said pin and box connections are screwed, and an inner tubular member longer than said outer member and having high compressive strength, both tubular members being loaded within their respective yield points, said inner member being of a length greater than the axial distance between said shoulders when said pin and box connections are tightly screwed into said outer tubular member, said inner tubular member being concentrically disposed within said outer tubular member with slight radial clearance forming an annular recess between said tubular members extending substantially the axial length of said inner member prior to loading said inner member, said annular shoulders of said pin and box connections contacting and compressing said inner tubular member when said connections are screwed to said outer tubular member, said inner tubular member being loaded in compression substantially to the critical point, causing said inner tubular member to buckle and contact the inner walls of said outer member, said inner walls preventing further buckling of the inner member at the point of contact, thereby restraining said inner tubular member to stress within its yield point, the arrangement being such that the outer member is prestressed in tension within its yield point, thereby to stiffen the drill collar against radial deformation as said collar is subjected to compressive loading.

(References on following page)

References Cited by the Examiner

UNITED STATES PATENTS

| | | | |
|---|---|---|---|
| 173,963 | 2/1876 | Johnson | 189—38 |
| 997,435 | 7/1911 | Bowman | 189—38 |
| 998,076 | 7/1911 | Daniels | 285—55 |
| 1,007,152 | 10/1911 | Sprague | 285—55 |
| 1,134,930 | 4/1915 | Theriot | 285—117 |
| 1,271,260 | 7/1918 | Axelson | 285—55 |
| 1,751,914 | 3/1930 | Greve | 285—390 X |
| 1,792,941 | 2/1931 | Stevenson | 285—55 |
| 1,953,172 | 4/1934 | Griffiths | 285—390 X |
| 2,453,079 | 11/1948 | Rossmann | 50—128 X |
| 2,648,895 | 8/1953 | Davis. | |
| 2,808,231 | 10/1957 | Kimbrell | 285—55 |
| 2,814,462 | 11/1957 | DeJarnett | 285—138 X |
| 2,850,264 | 9/1958 | Grable | 285—355 X |
| 2,927,806 | 3/1960 | Lahee | 285—333 X |
| 2,959,193 | 11/1960 | Guldenzoph | 175—320 |
| 3,047,313 | 7/1962 | Bruce | 285—333 X |
| 3,101,272 | 8/1963 | Setezer | 50—128 X |

CARL W. TOMLIN, *Primary Examiner.*